US008261117B2

(12) United States Patent
Duvalsaint et al.

(10) Patent No.: US 8,261,117 B2
(45) Date of Patent: Sep. 4, 2012

(54) VIRTUALIZATION IN A MULTI-CORE PROCESSOR (MCP)

(75) Inventors: Karl J. Duvalsaint, Lagrangeville, NY (US); Harm P. Hofstee, Austin, TX (US); Daeik Kim, Beacon, NY (US); Moon J. Kim, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 12/208,651

(22) Filed: Sep. 11, 2008

(65) Prior Publication Data

US 2010/0064156 A1 Mar. 11, 2010

(51) Int. Cl.
G06F 15/76 (2006.01)
G06F 9/46 (2006.01)
G06F 1/00 (2006.01)
G06F 1/32 (2006.01)
G06F 9/44 (2006.01)
G06F 13/00 (2006.01)

(52) U.S. Cl. ........ 713/322; 718/102; 718/104; 713/320; 713/300; 712/30; 712/13; 712/228; 711/141; 711/153

(58) Field of Classification Search ............ 712/30, 712/13, 228; 718/102, 104; 711/141, 153; 713/320, 322, 300
See application file for complete search history.

(56) References Cited

U.S. PATENT DOCUMENTS

| | | | |
|---|---|---|---|
| 5,721,883 A | 2/1998 | Katsuo et al. | |
| 5,881,303 A * | 3/1999 | Hagersten et al. | 712/30 |
| 6,067,603 A * | 5/2000 | Carpenter et al. | 711/141 |
| 6,215,898 B1 | 4/2001 | Woodfill et al. | |
| 6,404,902 B1 | 6/2002 | Takano et al. | |
| 6,456,737 B1 | 9/2002 | Woodfill et al. | |
| 6,567,622 B2 | 5/2003 | Phillips | |
| 6,661,931 B1 | 12/2003 | Kawada | |
| 6,744,931 B2 | 6/2004 | Komiya et al. | |
| 6,829,378 B2 | 12/2004 | DiFilippo et al. | |
| 6,922,783 B2 | 7/2005 | Knee et al. | |
| 7,028,196 B2 | 4/2006 | Soltis, Jr. et al. | |
| 7,080,267 B2 | 7/2006 | Gary et al. | |
| 7,095,882 B2 | 8/2006 | Akahori | |
| 7,102,777 B2 | 9/2006 | Haraguchi | |
| 7,418,368 B2 | 8/2008 | Kim et al. | |
| 7,461,272 B2 * | 12/2008 | Rotem et al. | 713/300 |
| 2005/0034002 A1 | 2/2005 | Flautner | |
| 2005/0071578 A1 * | 3/2005 | Day et al. | 711/153 |
| 2005/0083338 A1 | 4/2005 | Yun et al. | |
| 2005/0263678 A1 | 12/2005 | Arakawa | |
| 2005/0289365 A1 | 12/2005 | Bhandarkar | |

(Continued)

*Primary Examiner* — Thomas Lee
*Assistant Examiner* — Aurel Prifti
(74) *Attorney, Agent, or Firm* — William E. Schiesser; Ronald A. D'Alessandro; Keohane & D'Alessandro PLLC

(57) ABSTRACT

This invention describes an apparatus, computer architecture, method, operating system, compiler, and application program products for MPEs as well as virtualization in a symmetric MCP. The disclosure is applied to a generic microprocessor architecture with a set (e.g., one or more) of controlling elements (e.g., MPEs) and a set of groups of sub-processing elements (e.g., SPEs). Under this arrangement, MPEs and SPEs are organized in a way that a smaller number MPEs control the behavior of a group of SPEs. The apparatus enables virtualized control threads within MPEs to be assigned to different groups of SPEs for controlling the same. The apparatus further includes a MCP coupled to a power supply coupled with cores to provide a supply voltage to each core (or core group) and controlling-digital elements and multiple instances of sub-processing elements.

20 Claims, 2 Drawing Sheets

U.S. PATENT DOCUMENTS

| | | |
|---|---|---|
| 2006/0013473 A1 | 1/2006 | Woodfill et al. |
| 2006/0069936 A1* | 3/2006 | Lint et al. .................. 713/320 |
| 2006/0250514 A1 | 11/2006 | Inoue et al. |
| 2006/0268357 A1 | 11/2006 | Vook et al. |
| 2007/0159642 A1 | 7/2007 | Choi |
| 2007/0220517 A1* | 9/2007 | Lippett .................. 718/102 |
| 2008/0077815 A1* | 3/2008 | Kanakogi .................. 713/322 |
| 2008/0109811 A1* | 5/2008 | Krauthgamer et al. ....... 718/104 |
| 2008/0126750 A1* | 5/2008 | Sistla .................. 712/30 |
| 2008/0229127 A1* | 9/2008 | Felter et al. .................. 713/320 |
| 2008/0244222 A1* | 10/2008 | Supalov et al. .................. 712/13 |
| 2009/0049317 A1* | 2/2009 | Gara et al. .................. 713/320 |
| 2010/0082951 A1* | 4/2010 | Bates et al. .................. 712/228 |

* cited by examiner

VIRTUALIZATION IN A MULTI-CORE PROCESSOR (MCP)

FIELD OF THE INVENTION

The present invention generally relates to virtualization in a (e.g., symmetric) multi-core processor (MCP). Specifically, the present invention associates/assigns virtualization threads of a main processing element (MPE) to groups of sub-processing elements (SPEs) for improved operation management and power savings.

BACKGROUND OF THE INVENTION

Low utilization of Multi-Core Processors (MCPs) has been a major drawback of symmetric MCPs. Also, design inflexibility forces continuous leakage current in the unloaded and stand-by sub-elements, such as Sub-Processing Element (SPE), so that the power is wasted. For example, in a symmetric MCP, there can be a Main Processing Element (MPE) and 8 SPEs. In many cases, only a portion of SPEs are utilized and the overall MCP utilization is usually low. Such stand-by SPEs consume high levels of power and continuously leak. Typically, a MCP is used for the high performance digital processor scaling, but due to the complexity of the MCP design, the utilization and the efficiency of the software become challenging to optimize as the MCP dimension increases.

SUMMARY OF THE INVENTION

This invention describes an apparatus, computer architecture, method, operating system, compiler, and application program products for MPEs as well as virtualization in a symmetric MCP. The disclosure is applied to a generic microprocessor architecture with a set (e.g., one or more) of controlling elements (e.g., MPEs) and a set of groups of sub-processing elements (e.g., SPEs). Under this arrangement, MPEs and SPEs are organized in a way that a smaller number MPEs control the behavior of a group of SPEs. The apparatus enables virtualized control threads within MPEs to be assigned to different groups of SPEs for controlling the same. The apparatus further includes a MCP coupled to a power supply coupled with cores to provide a supply voltage to each core (or core group) and controlling-digital elements and multiple instances of sub-processing elements.

A first aspect of the present invention provides a multi-core processor, comprising: a set of main processing elements each comprising a set of virtualized control threads; and a set of groups of sub-processing elements, each one of the set of virtualized control threads controlling at least one of the set of groups of sub-processing elements.

A second aspect of the present invention provides a processing system, comprising: a main processing element; a group of sub-processing elements; and a virtualized control thread associating the main processing element with the group of sub-processing elements, the virtualized control thread controlling the group of sub-processing elements.

A third aspect of the present invention provides a processing method, comprising: associating a set of main processing elements with a set of groups of sub-processing elements using a set of virtualized control threads; and controlling the set of groups of sub-processing elements using the set of virtualized control threads.

A fourth aspect of the present invention provides a method for deploying a processing system, comprising: providing a multi-core processor comprising: a set of main processing elements each comprising a set of virtualized control threads; and a set of groups of sub-processing elements, each one of the set of virtualized control threads controlling at least one of the set of groups of sub-processing elements.

A fifth aspect of the present invention provides a computer-implemented business method, comprising: associating a set of main processing elements with a set of groups of sub-processing elements using a set of virtualized control threads; and controlling the set of groups of sub-processing elements using the set of virtualized control threads.

BRIEF DESCRIPTION OF THE DRAWINGS

These and other features of this invention will be more readily understood from the following detailed description of the various aspects of the invention taken in conjunction with the accompanying drawings in which.

Figure 1:
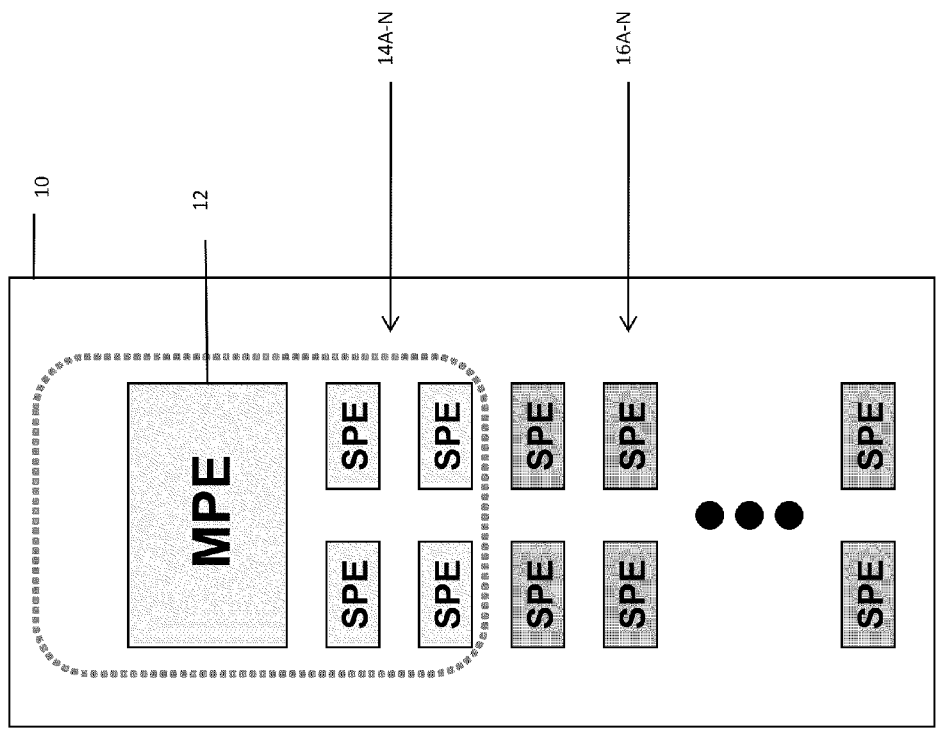
FIG. 1 shows a related art processor.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, this invention describes an apparatus, computer architecture, method, operating system, compiler, and application program products for MPEs as well as virtualization in a symmetric MCP. The disclosure is applied to a generic microprocessor architecture with a set (e.g., one or more) of controlling elements (e.g., MPEs) and a set of groups of sub-processing elements (e.g., SPEs). Under this arrangement, MPEs and SPEs are organized in a way that a smaller number MPEs control the behavior of a group of SPEs. The apparatus enables virtualized control threads within MPEs to be assigned to different groups of SPEs for controlling the same. The apparatus further includes a MCP coupled to a power supply coupled with cores to provide a supply voltage to each core (or core group) and controlling-digital elements and multiple instances of sub-processing elements.

Under related art systems, such as that shown in FIG. 1, the MCP 10 provides a conventional operation: a MPE 12 controls a group of SPEs 14A-N. As only a portion of SPEs are utilized, the overall MCP utilization is usually low. Moreover, stand-by SPEs 16A-N consume high levels of power and continuously leak. Typically, a MCP is used for the high performance digital processor scaling, but due to the complexity of the MCP design, the utilization and the efficiency of the software become challenging to optimize as the MCP dimension increases.

Figure 2:
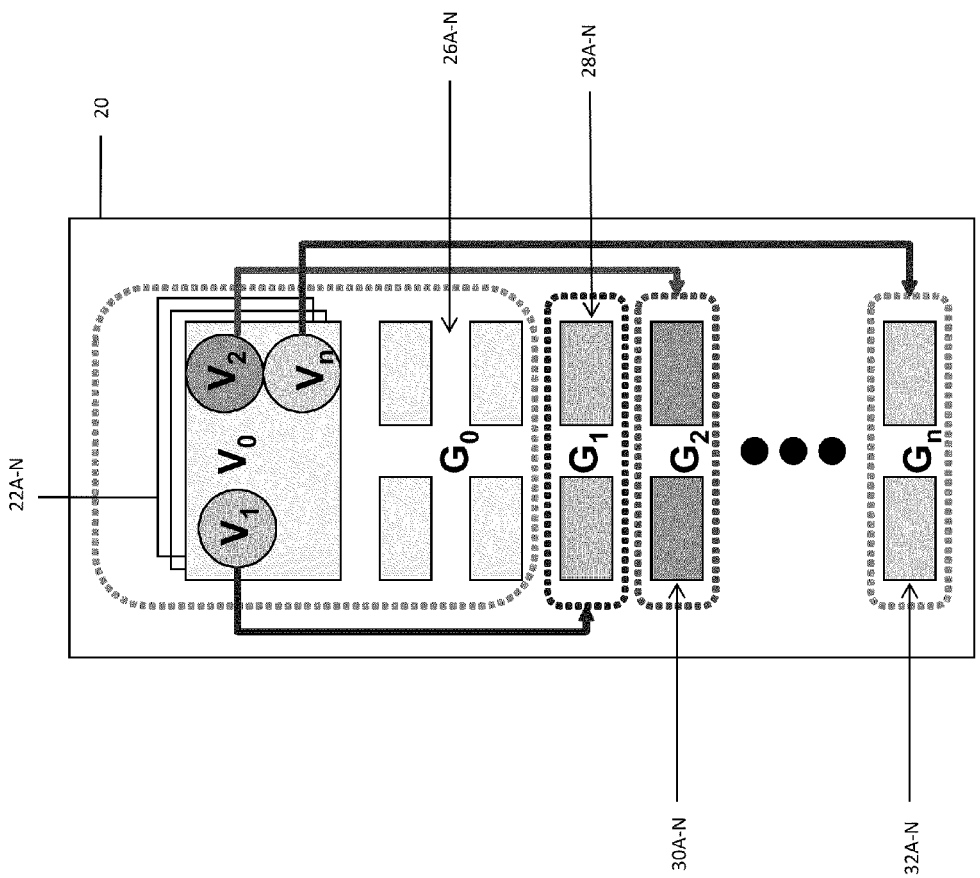
FIG. 2 shows multi-core processor according to the present invention.

To address these issues, a configuration such as that shown in FIG. 2 is provided. As depicted, MCP 20 comprises a set of MPEs 22A-N. Each MPE 22A-N comprises a set of virtualized control threads V1-VN. Under the present invention MPEs 22A-N allow multiple virtualized control threads V1-VN that are each assigned to/associated with a (e.g., single) group of SPEs. For example, as further shown in FIG. 1, MCP 20 further includes groups G0-Gn of SPEs. In the example shown, group G0 comprises SPEs 26A-N, group G1 comprises SPEs 28A-N, group G2 comprises SPEs 30A-N, and group Gn comprises SPEs 32A-N. It should be understood that the configuration shown is for illustrative purposes only and neither the quantity of SPEs nor their grouping is intended to limit the teachings recited herein. In any event, as can been seen, virtualized control threads V1-Vn are each associated with a specific group of SPEs. That is, virtualized control thread V1 is associated with SPE group G1, virtualized control thread V2 is associated with SPE group G2, while virtualized control thread Vn is associated with SPE group Gn.

In a typical embodiment, there is a one-to-one relationship between threads and groups (however, this need not be the case in that a single virtualized control thread could be associated with multiple groups). In addition, all virtualized control threads V1-Vn are shown as being embodied within a single, common MPR 22. However, it should be understood that this need not be the case. For example, virtualized control threads could be embodied in two or more different MPEs 22A-N.

Regardless, each virtualized control thread V1-Vn serves to associate/link at least one MPE with at least one group of SPEs. This allows the SPEs to be controlled. Specifically, each virtualized control thread V1-Vn is typically implemented as computer program code (e.g., contained on a computer readable medium). The virtualized control threads have several functions including (among others) the following: sending program code and data to the set of groups of sub-processing elements; collecting computation results from the set of groups of sub-processing elements; sending and receiving power control requests between the set of main processing elements and the set of groups of sub-processing element; and controlling a clock speed, power consumption and computation loading of the set of groups of sub-processing elements.

A more specific illustrative embodiment of the association of virtualized control threads with groups of SPEs will be given below: Using the teachings recited above, each MPE allows additional virtualizations, based upon the SPEs availability and the number of requested SPEs. The MPE keeps a log of which SPEs "belong" to the MPE. The computation-loaded SPEs as well as unloaded & free SPEs are accounted within the log. The virtualization (e.g., virtualized control threads) is initiated by either a software or hardware request. An Operating System (OS) is designed to enable multiple independent threads with virtualization. Computer programming languages and the machine code compilers support the virtualization with libraries. The MPE also can tune the rest of the virtualized control threads using time-division resource sharing and OS-level preemptive task management to allow for multi-tasking and virtualization. By allowing main and pseudo MPEs, the MPE loading is reduced and becomes more efficient. Therefore the MCP performance vs. power efficiency increases.

As described above in conjunction with FIG. 2, a group of SPEs (Gn) are assigned to the virtualized control threads. The MPE maintains different virtualized control threads over the SPEs, as shown in the diagram. The virtualized control thread loads executable program codes and data to its associated SPE group, and monitors the progress and controls the performance and power consumption of the SPE group. When the SPE group produces computation results, the virtualized control thread sends the results to the MPE, allowing further computations or external input/output (I/O). The number of total virtualization is limited by the MPE and SPE capacity to hold virtualization, and the number of available SPEs. Further requests for virtualization can be denied, or accepted by sharing time-division thread sharing.

The virtualized control threads in the MPE control the power supply voltage and clock frequency to each SPE group, so that the active and stand-by currents are optimized for the required computations. Typically, a digital circuit speed increases when the supply voltage is raised, and the clock speed can be increased. Within the allowed supply voltage range, it is adjusted based on the computation requirements. When the loaded computation requires intensive operation, the voltage and clock frequency are raised so that it is completed within the time frame. When the loaded computation is loose and if there are plenty of time for processing, the voltage and the clock frequency are lowered to maximize performance/power ratio. An extreme case is when SPEs are standing by. The supply voltage can be reduced to 0 voltage to put the SPE is sleep mode. Slightly higher voltages can be used with a trade-off between leakage current and wake up time. It takes more time to wake an element when it is in a deeper sleep mode.

It should be understood that the present invention could be deployed on one or more computing devices (e.g., servers, clients, etc.) within a computer infrastructure. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, the computer infrastructure is intended to demonstrate that some or all of the components of such an implementation could be deployed, managed, serviced, etc. by a service provider who offers to implement, deploy, and/or perform the functions of the present invention for others.

Where computer hardware is provided, it is understood that any computers utilized will include standard elements such as a processing unit, a memory medium, a bus, and input/output (I/O) interfaces. Further, such computer systems can be in communication with external I/O devices/resources. In general, processing units execute computer program code, such as the functionality described above (e.g., all libraries discussed herein), which is stored within memory medium(s). While executing computer program code, the processing unit can read and/or write data to/from memory, I/O interfaces, etc. The bus provides a communication link between each of the components in a computer. External devices can comprise any device (e.g., keyboard, pointing device, display, etc.) that enable a user to interact with the computer system and/or any devices (e.g., network card, modem, etc.) that enable the computer to communicate with one or more other computing devices.

The hardware used to implement the present invention can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, the processing unit therein may comprise a single processing unit, or be distributed across one or more processing units in one or more locations, e.g., on a client and server. Similarly, the memory medium can comprise any combination of various types of data storage and/or transmission media that reside at one or more physical locations. Further, the I/O interfaces can comprise any system for exchanging information with one or more external device. Still further, it is understood that one or more additional components (e.g., system software, math co-processing unit, etc.) can be included in the hardware.

While shown and described herein as virtualization in a multi-core processor, it is understood that the invention further provides various alternative embodiments. For example, in one embodiment, the invention provides a computer-readable/useable medium that includes computer program code to enable a computer infrastructure to provide visualization in a multi-core processor. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method (e.g., business) that performs the process of the invention on a subscription, advertising, and/or fee basis. That is, a service provider, such as a Solution Integrator, could offer to provide virtualization in a multi-core processor. In this case, the service provider can create, maintain, support, etc., a computer infrastructure, such as computer infrastructure that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a processing method. In this case, a computer infrastructure can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A multi-core processor, comprising:
a set of main processing elements each comprising a set of virtualized control threads; and
a plurality of groups of sub-processing elements associated with each of the set of main processing elements, each one of the set of virtualized control threads being independent from each other to enable independent controlling of at least one of the plurality of groups of sub-processing elements, wherein each of the plurality of groups of sub-processing elements receives an independent supply voltage, which is controlled by an associated control thread so as to adjust a clock frequency and a power supply to each of the plurality of groups of sub-processing elements based on computational requirements, and wherein a quantity of sub-processing elements within each of the sets of groups of sub-processing elements is variable and based on an optimal utilization of sub-processing elements.

2. The multi-core processor of claim 1, each of the set of groups of sub-processing elements comprising a plurality of sub-processing elements.

3. The multi-core processor of claim 1, the set of virtualized control threads being configured to send program code and data to the set of groups of sub-processing elements.

4. The multi-core processor of claim 3, the set of virtualized control threads being further configured to collect computation results from the set of groups of sub-processing elements.

5. The multi-core processor of claim 1, the set of virtualized control threads controlling computation loading of the set of groups of sub-processing elements.

6. The multi-core processor of claim 1, the set of virtualized control threads being configured to send and receive power control requests between the set of main processing elements and the set of groups of sub-processing elements.

7. The multi-core processor of claim 1, the set of main processing elements comprising a plurality of main processing elements.

8. The multi-core processor of claim 1, each one of the set of visualized control threads being associated with a single group of sub-processing elements.

9. A processing system, comprising:
  a plurality of main processing element;
  a group of sub-processing elements associated with each of the plurality of main processing elements; and
  a virtualized control thread associating each of the main processing elements with the associated group of sub-processing elements, the virtualized control thread being independent from any other virtualized control thread to enable independent controlling of the group of sub-processing elements, wherein each of the plurality of groups of sub-processing elements receives an independent supply voltage, which is controlled by an associated control thread so as to adjust a clock frequency and a power supply to each of the plurality of groups of sub-processing elements based on computational requirements, and wherein a quantity of sub-processing elements in the group of sub-processing elements is variable and based on an optimal utilization of sub-processing elements.

10. The processing system of claim 9, the virtualized control thread being embodied within the set of main processing elements.

11. The processing system of claim 9, the virtualized control thread being configured to send program code and data to the group of sub-processing elements.

12. The processing system of claim 9, the virtualized control thread being further configured to collect computation results from the group of sub-processing elements.

13. The processing system of claim 9, the virtualized control thread controlling computation loading of the group of sub-processing elements.

14. A processing method, comprising:
  associating a set of main processing elements with a set of groups of sub-processing elements using a set of independent virtualized control threads, wherein each of the plurality of groups of sub-processing elements receives an independent supply voltage, which is controlled by an associated control thread so as to adjust a clock frequency and a power supply to each of the plurality of groups of sub-processing elements based on computational requirements, and wherein a quantity of sub-processing elements within each of the sets of groups of sub-processing elements is variable and based on an optimal utilization of sub-processing elements; and
  independently controlling each of the set of groups of sub-processing elements using the set of independent virtualized control threads.

15. The processing method of claim 14, further comprising sending program code and data to the set of groups of sub-processing elements via the set of virtualized control threads.

16. The processing method of claim 14, further comprising receiving computation results from the set of groups of sub-processing elements via the set of virtualized control threads.

17. The processing method of claim 14, the controlling comprising controlling a computation loading of the set of groups of sub-processing elements.

18. The processing method of claim 14, the set of virtualized control threads being embodied as program code within the set of main processing elements.

19. The processing method of claim 14, the set of main processing elements, the set of groups of sub-processing elements, and the set of virtualized control threads comprising a multi-core processor.

20. A method for deploying a processing system, comprising:
  providing a multi-core processor comprising:
    a set of main processing elements each comprising a set of virtualized control threads; and
    a plurality of groups of sub-processing elements associated with each of the set of main processing elements, each one of the set of virtualized control threads being independent from each other to enable independent controlling of at least one of the plurality of groups of sub-processing elements, wherein each of the plurality of groups of sub-processing elements receives an independent supply voltage, which is controlled by an associated control thread so as to adjust a clock frequency and a power supply to each of the plurality of groups of sub-processing elements based on computational requirements, and wherein a quantity of sub-processing elements within each of the sets of groups of sub-processing elements is variable and based on an optimal utilization of sub-processing elements.

* * * * *